(12) United States Patent
Mohindra et al.

(10) Patent No.: US 7,950,007 B2
(45) Date of Patent: May 24, 2011

(54) METHOD AND APPARATUS FOR POLICY-BASED CHANGE MANAGEMENT IN A SERVICE DELIVERY ENVIRONMENT

(75) Inventors: Ajay Mohindra, Yorktown Heights, NY (US); Vijay K. Naik, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 1378 days.

(21) Appl. No.: 11/453,514

(22) Filed: Jun. 15, 2006

(65) Prior Publication Data

US 2007/0294420 A1     Dec. 20, 2007

(51) Int. Cl.
    *G06F 9/44* (2006.01)
(52) U.S. Cl. .................. 717/173; 717/120; 709/230
(58) Field of Classification Search .......... 717/120–123, 717/168–178; 709/224, 230
    See application file for complete search history.

(56) References Cited

U.S. PATENT DOCUMENTS

| | | | |
|---|---|---|---|
| 6,286,047 B1 | 9/2001 | Ramanathan et al. | |
| 6,330,689 B1 | 12/2001 | Jin et al. | |
| 6,901,442 B1 | 5/2005 | Schwaller et al. | |
| 7,013,461 B2 | 3/2006 | Hellerstein et al. | |
| 7,181,743 B2 | 2/2007 | Werme et al. | |
| 7,243,306 B1 | 7/2007 | Joshi et al. | |
| 7,340,654 B2 * | 3/2008 | Bigagli et al. ................ | 714/47 |
| 7,343,601 B2 | 3/2008 | Azagury et al. | |
| 7,366,768 B2 | 4/2008 | Deo et al. | |
| 7,464,154 B2 | 12/2008 | Dick et al. | |
| 7,496,893 B2 * | 2/2009 | Mohindra et al. ............ | 717/120 |
| 7,668,741 B2 | 2/2010 | Ernest et al. | |
| 7,694,303 B2 | 4/2010 | Hahn et al. | |
| 7,703,029 B2 | 4/2010 | Bozak et al. | |
| 7,712,100 B2 | 5/2010 | Fellenstein et al. | |
| 2003/0167270 A1 | 9/2003 | Werme et al. | |
| 2004/0003390 A1 | 1/2004 | Canter et al. | |
| 2004/0103195 A1 | 5/2004 | Chalasani et al. | |
| 2004/0261060 A1 | 12/2004 | Haselden et al. | |
| 2005/0102665 A1 | 5/2005 | Barta et al. | |
| 2005/0138084 A1 | 6/2005 | Azagury et al. | |

(Continued)

FOREIGN PATENT DOCUMENTS

EP     1548586 A     6/2005

OTHER PUBLICATIONS

Foster, I.; Kesselman, C.; Nick, J.M.; Tuecke, S.; , "Grid services for distributed system integration," Computer , vol. 35, No. 6, pp. 37-46, Jun. 2002; doi: 10.1109/MC.2002.1009167 URL: http://ieeexplore.ieee.org/stamp/stamp.jsp?tp=&arnumber=1009167&isnumber=21753.*

(Continued)

*Primary Examiner* — Wei Y Zhen
*Assistant Examiner* — Satish Rampuria
(74) *Attorney, Agent, or Firm* — Yee & Associates, P.C.; Preston J. Young

(57) ABSTRACT

A computer implemented method, data processing system, and computer usable program code are provided for maintaining a computer network. Resources and services affected by a change to a resource are identified in response to receiving a request for the change. A determination of an optimal time for the change is made based on a policy associated with the service. The change is deployed with a deployment engine.

20 Claims, 4 Drawing Sheets

U.S. PATENT DOCUMENTS

| | | | | |
|---|---|---|---|---|
| 2006/0195559 | A1* | 8/2006 | Winter et al. | 709/223 |
| 2006/0294238 | A1* | 12/2006 | Naik et al. | 709/226 |
| 2007/0050431 | A1 | 3/2007 | Vaidya et al. | |
| 2008/0072220 | A1* | 3/2008 | Saffre et al. | 717/177 |
| 2008/0168424 | A1 | 7/2008 | Mohindra et al. | |

OTHER PUBLICATIONS

Friese et al., Hot service deployment in an ad hoc grid environment; ACM, 2004, pp. 75-83.*

Goldsack et al, "SmartFrog: Configuration and Automatic Ignition of Distributed Applications", May 29, 2003, HP OVUA 2003, pp. 1-9.

Anderson, "Towards a High-Level Machine Configuration System", Sep. 19-23, 1994 LISA Confefence, San Diego, CA, pp. 19-26.

U.S. Appl. No. 11/453,741, filed Jun. 15, 2006, Mohindra et al.

U.S. Appl. No. 11/453,508, filed Jun. 15, 2006, Mohindra et al.

U.S. Appl. No. 11/453,507, filed Jun. 15, 2006, Mohindra et al.

* cited by examiner

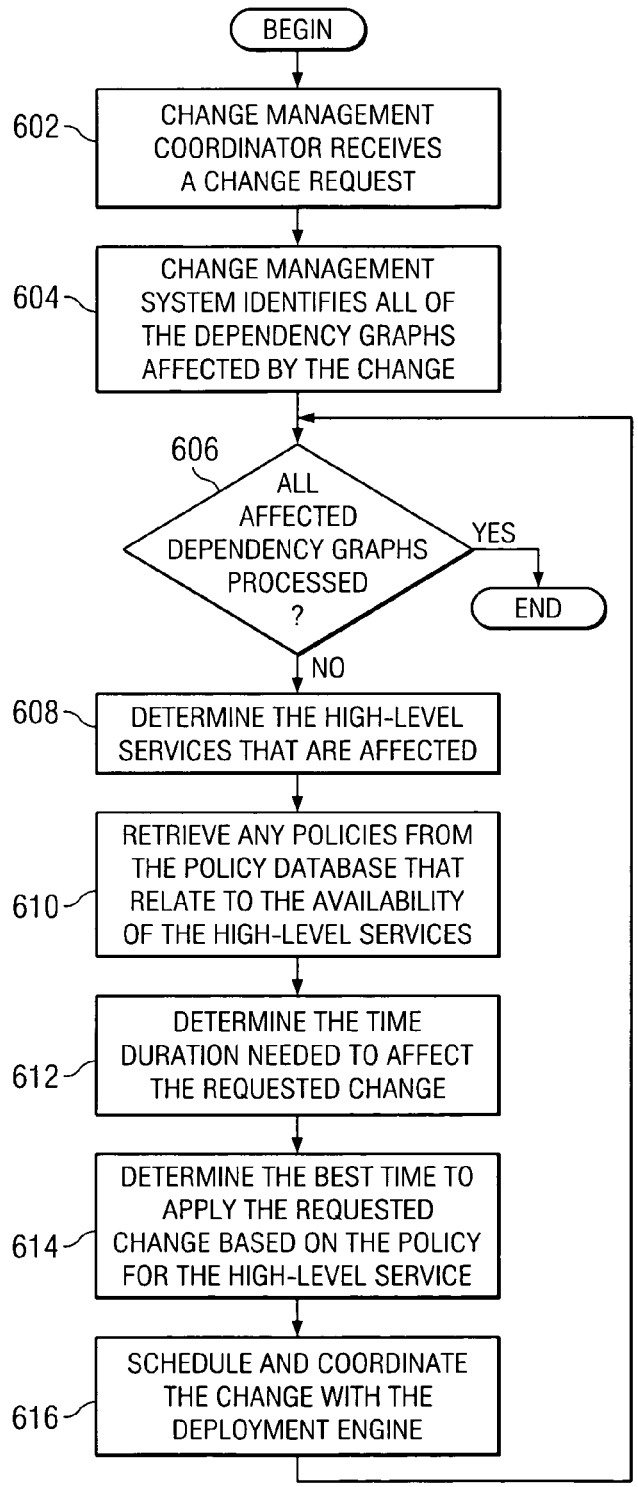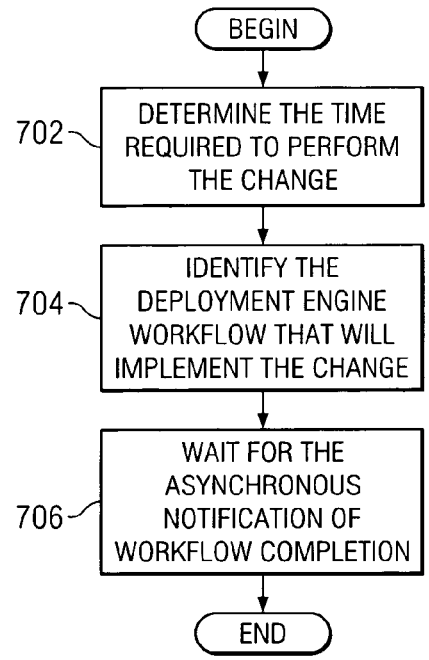

METHOD AND APPARATUS FOR POLICY-BASED CHANGE MANAGEMENT IN A SERVICE DELIVERY ENVIRONMENT

BACKGROUND OF THE INVENTION

1. Field of the Invention

The present invention relates generally to data processing systems and more particularly to a computer implemented method for software and systems management in networked computer environments. Still more particularly, the present invention provides a computer implemented method, data processing system, and computer usable program code for providing policy-based changes to resources in a federated environment.

2. Description of the Related Art

Enterprises are increasingly moving towards a grid-based computing environment as they strive to contain information technology costs and streamline their businesses through outsourcing of non-core business processes and sharing of distributed resources. Grid is the ability, using a set of open standards and protocols, to gain access to applications and data, processing power, storage capacity, and a vast array of other computing resources over the Internet. A grid system is a type of parallel and distributed system that enables the sharing, selection, and aggregation of resources distributed across multiple administrative domains based on the resources availability, capacity, performance, cost, and users' quality-of-service requirements The grid infrastructure is emerging to be a common platform for realizing such changes. The grid infrastructure provides middleware services for discovery, naming, messaging, monitoring, and resource brokering. Middleware is software that connects two otherwise separate applications allowing data to pass between the applications. Middleware functions as a communications layer that allows applications to interact across hardware and network environments.

While grid-based systems can facilitate resource sharing across multiple administrative domains, grid-based systems are much harder to manage from a system administration point of view. One reason for this is that the current state-of-the-art in system management technology has not kept pace with the advances in middleware. Most of the progress has been in managing single or cluster-based systems. Even for such systems, system administrators face a much higher level of complexity when they have to configure and deploy a new service on an existing infrastructure or manage the lifecycle of the existing service and software stack. The situation is much worse in a complex application environment, for example, an environment involving orchestration of a workflow formed by multiple business processes. In such cases, deployment and life cycle management solutions need to take an integrated view of the multiple tiers involved, and current system management technologies do not provide the necessary means to build such solutions.

A federated environment is a collection of component services and resources belonging to multiple administrative domains that cooperate and coordinate their activities so as to deliver a composite higher level service without violating policies corresponding to individual administrative domains. These federated systems are sometimes referred to as virtual organizations, collective services, on-demand clusters, agreement-based cooperating systems, and so on. A key characteristic of federated systems is that individual components are not dedicated to provide their services to the virtual organization for its entire lifetime, but their commitment to provide the service is limited to a well-defined period of time. Components are constituent elements that form the organization of a grid. For example, a component could be a physical box (hardware), an application server instance (software), or a firewall (network).

Often times, the individual components have the liberty to leave the virtual organization with or without prior notice. As a result, the composite federated system must always be prepared to deal with the changes in the service levels offered by individual components, as well as asynchronous availability and unavailability of the component services. Traditional system management controls that are designed for dedicated and static cluster-based systems are not geared towards handling such dynamic and continuously evolving systems.

During the lifetime of any service, there are times when the changes need to be made to the underlying resource infrastructure that provides the service. Changes may be made to either to hardware or software components. A change is an update, repair, or alteration to a resource. Hardware resource changes may include adding new hardware, upgrading, repairing, or removing old hardware. Software resource changes may include updating software components by applying software patches, removing old versions, or installing new versions of the software. Further, changes may also include configuration changes, such as changes in allocated heap size, to the underlying software components. Currently, performing these changes requires that the system administrator be aware of the relationships and dependencies between resources and high-level services. Keeping track of relationships and dependencies may sometimes be tedious or impossible when the resources belong to different administrative domains.

SUMMARY OF THE INVENTION

The different illustrative embodiments provide a computer implemented method, data processing system, and computer usable program code for maintaining a computer network. Resources and services affected by a change to a resource are identified in response to receiving a request for the change. A determination of an optimal time for the change is made based on a policy associated with the service. The change is deployed with a deployment engine.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of the illustrative embodiments when read in conjunction with the accompanying drawings, wherein:

FIG. 6 is a flowchart illustrating the steps performed by a change management system in accordance with an illustrative embodiment; and FIG. 7 is a flowchart illustrating a change management coordinator scheduling and coordinating changes in accordance with an illustrative embodiment.

DETAILED DESCRIPTION OF THE PREFERRED EMBODIMENT

Figures 1, 2:
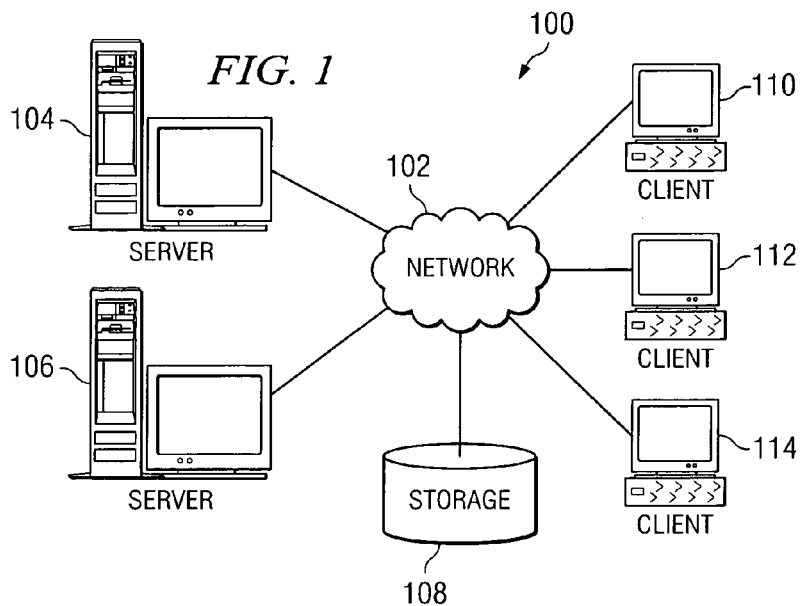
FIG. 1 depicts a pictorial representation of a network of data processing systems in which illustrative embodiments may be implemented.
FIG. 2 depicts a block diagram of a data processing system in which illustrative embodiments may be implemented.

With reference now to the figures and in particular with reference to FIGS. 1-2, exemplary diagrams of data processing environments are provided in which embodiments may be implemented. It should be appreciated that FIGS. 1-2 are only exemplary and are not intended to assert or imply any limitation with regard to the environments in which embodiments may be implemented. Many modifications to the depicted environments may be made without departing from the spirit and scope of the illustrative embodiments.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes for embodiments may be located.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide for a computer implemented method, data processing system, and computer usable program code for compiling source code. The computer implemented methods of the illustrative embodiments may be performed in a data processing system, such as data processing system 100 shown in FIG. 1 or data processing system 200 shown in FIG. 2.

The illustrative embodiments provide a computer implemented method for software and systems management in networked computer environments. The illustrative embodiments facilitate the maintenance of a computer network, such as network data processing system 100 of FIG. 1 by providing policy-based changes to resources. A change management coordinator within a change management system identifies resources and services affected by the change. The resources and services affected by the change may be identified in a dependency graph. The services are identified by scanning all published high-level services and then retrieving dependency graphs for the high-level services that are found. High-level services are services that provide business specific function to business's consumers. These high-level services in turn may utilize other services to realize the business specific function. An example of a high-level service is a service that processes mortgage loan applications. This mortgage service may utilize other service, such as a credit checking service and a home value appraiser service to process the loan application. Resources are components that are required to implement services. For example, a resource may be a physical compute server, an application server, or a web server. A service is a function offered by a logical component. For example, a compute service may provide compute function, while a database service may provide a storage function. Resources may be strictly hardware resources, strictly software resources or a combination of hardware and software.

The change management coordinator schedules the change according to a policy of a high-level service. The policy may establish the logistics of the change. For example, the policy may establish when the change will occur, how long implementing the change will take, which dependencies or resources may fail, and when, if ever, the dependencies may be ready for the change.

Figure 3:
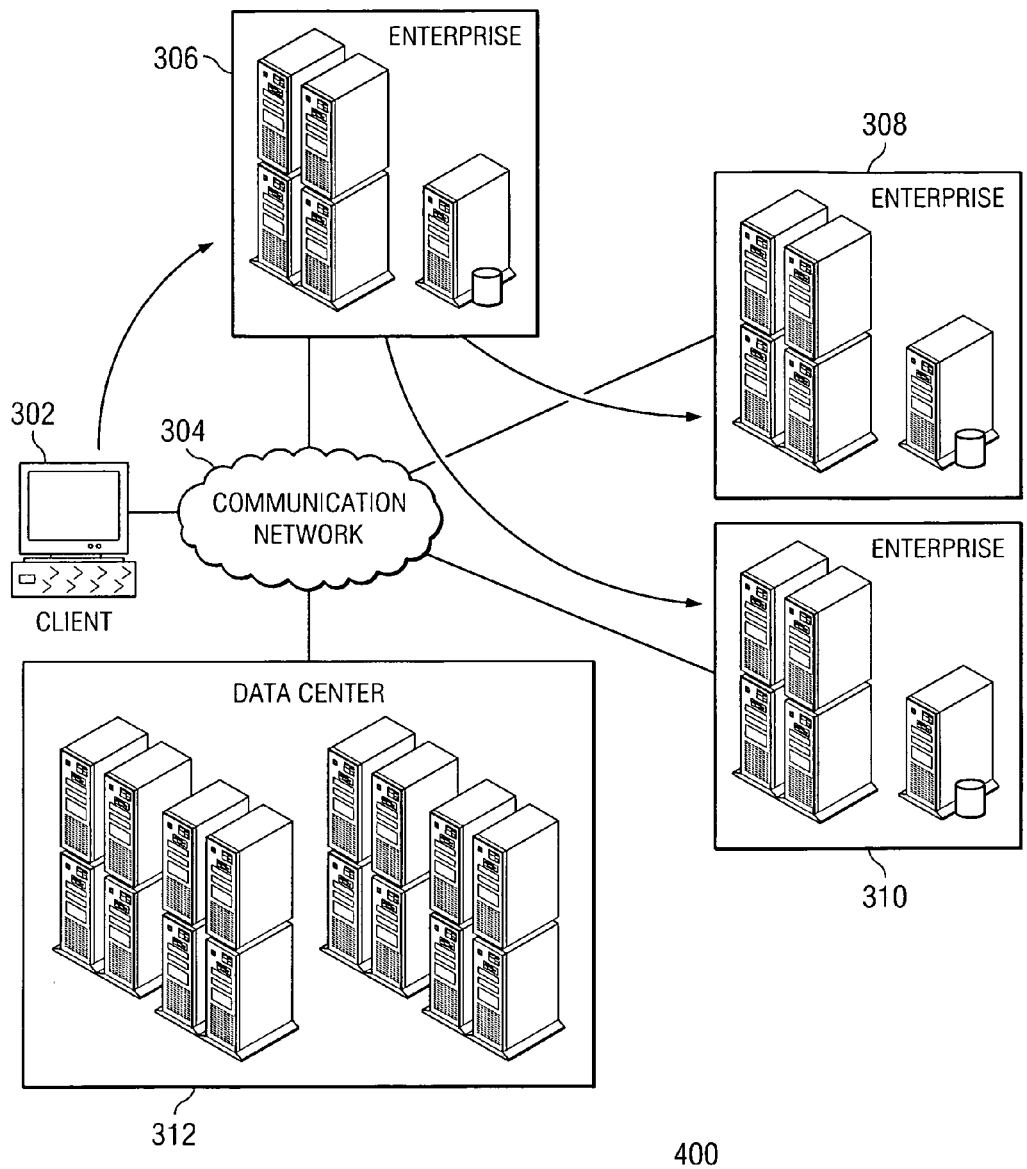
FIG. 3 depicts a schematic representation of a grid system in accordance with an illustrative embodiment.

FIG. 3 depicts a schematic representation of a grid system in accordance with an illustrative embodiment. The grid system may be part of a federated environment. A federated environment is a collection of resources belonging to different administrative domains, and interaction among federated systems is usually governed by service-level agreements among two or more parties. Any changes to a subsystem in a federated requirement require notification and concurrence from administrators of other federated environments that might be affected by the changes. A normal computer network typically belongs to one organization, and no service-level agreements are associated with the functioning of the computer system.

A typical grid system consists of software client 302, such as a browser or a dedicated application, connected to a communication network, such as communication network 304. Software client 302 may be a client, such as client 110, 112, or 114 of FIG. 1, and communication network 304 may be a network, such as network 102 of FIG. 1. Software client 302 utilizes services and resources made available by enterprise 306. These services and resources are in the form of applications, for example, online banking applications or online shopping applications. Further, the applications offered by enterprise 306 might utilize services and resources offered by other enterprises, such as enterprise 308 or 310 which are also connected to communication network 304. Enterprises 306, 308, and 310 use a grid infrastructure for hosting of services and resources.

For example, enterprise 306 may be a bank, enterprise 308 may be a credit checking service, and enterprise 310 may be a stockbroker service. Enterprise 306 and enterprise 310 may have a dependency on a credit checking application offered by enterprise 308. As a result, when enterprise 308 prepares to perform updates, such as releasing a new software version, enterprise 308 notifies enterprise 306 and enterprise 310 of the pending change. A notification is made by sending a message to the change management coordinator of the enterprise along with an email message to the administrator for that enterprise. The email is sent solely for auditing purposes.

Dependencies for a resource, such as the credit checking application may be indicated in a dependency graph. The dependency graph is a list, file, or other representation of consuming applications, libraries, and enterprises that rely on the resource to be updated.

Data center 312 may provide raw resources, operating system stack, and middleware services to run applications and application specific middleware services. Application specific middleware services are a subset of middleware services that link specific instances of software applications and are not general use middleware services. Data center 312 may provide resources and services that can be configured according to requirements of the higher-level services and applications used in enterprises 306, 308, and 310. For example, high-level services may be used by a user to perform on-line banking transactions and document collaboration.

Data center 312 is typically used when enterprise 306, 308, or 310 runs out of resources to handle peak load. During these times, enterprise 306, 308, or 310 may request additional resources from data center 312 and divert some of enterprise 306, 308, or 310's workload to data center 312. Data center 312 may also host the applications and provide the necessary supporting services and resources. Examples of common service include a metering service that meters activity, a monitoring service that monitors datacenter resources, and a logging service for auditing. Examples of resources include network switches, computer servers, and data storage servers. The illustrative embodiments use the term supporting services to illustrate service components on which one or more other components may depend upon to deliver their service. Supporting services are indicated as dependencies in the dependency graph.

Figure 4:
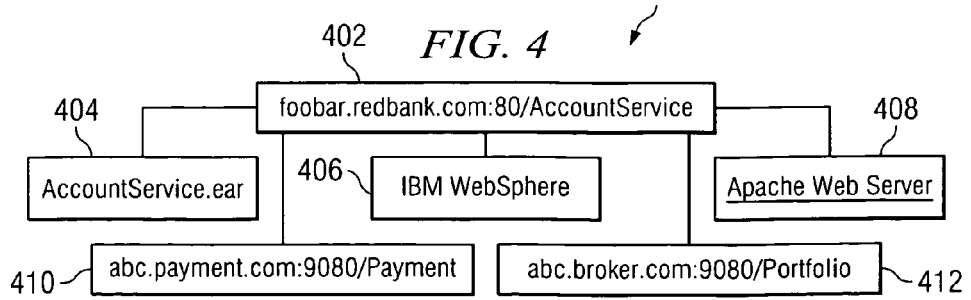
FIG. 4 is an example of an object dependency graph for a service in accordance with an illustrative embodiment.

FIG. 4 is an example of an object dependency graph for a service in accordance with an illustrative embodiment. Object dependency graph 400 may describe the dependencies of an enterprise, such as enterprise 306 of FIG. 3. Object dependency graph 400 includes service 402 shown as foobar.redbank.com:80/AccountService. For example, service 402 may be an on-line bank accessible to a user over the Internet. In one example, service 402 may be accessed in the form of a uniform resourced identifier (URI), hyperlink, hyper text transfer protocol (HTTP), or other format. Hyper text transfer protocol is the actual communications protocol that enables Web browsing between a client device and a server. A uniform resource identifier is a formatted string that serves as an identifier for a resource, typically on the Internet. Uniform resource identifiers are used in software languages, such as hypertext markup language (HTML) to identify the anchors of hyperlinks.

As shown in this example, service 402 is dependent upon application ear file 404, IBM WebSphere application server 406, and Apache Web Server 408 for additional services and functionality. Further, service 402 is dependent upon externally hosted services 410 and 412 shown as abc.payment.com:9080/Payment and abc.broker.com:9080/Portfolio, respectively. For example, externally hosted service 410 may be used to receive a payment for services offered by service 402. Externally hosted service 412 may be used to save data regarding financial assets in a portfolio. A change management system may be used in conjunction with a user-defined policy to determine how changes and updates may most effectively be implemented to objects within object dependency graph 400.

Figure 5:
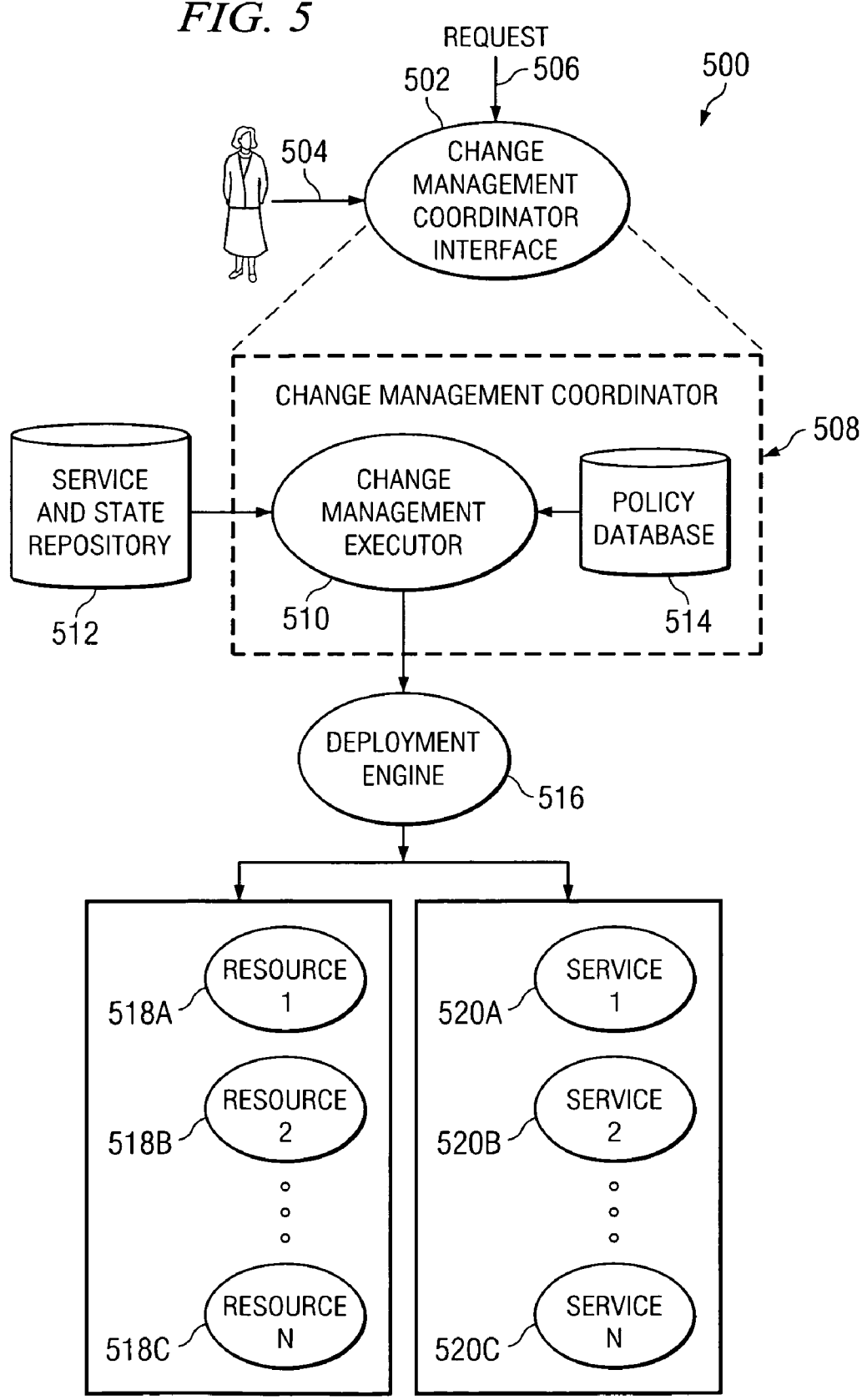
FIG. 5 depicts a schematic representation of the logical architecture of a change management system in accordance with an illustrative embodiment.

FIG. 5 depicts a schematic representation of the logical architecture of a change management system in accordance with an illustrative embodiment. Change management system 500 exposes change management coordinator (CMC) interface 502. Change management system 500 may be implemented in an enterprise, such as enterprise 308 of FIG. 3. Change management coordinator interface 502 is the interface that receives change requests from various sources.

For example, change management coordinator interface 502 may receive a change request from system administrator 504. Additionally, request 506 may be received from other change management coordinators located in other enterprises. The changes may be either hardware or software changes. Hardware changes may include adding new hardware and upgrading or removing old hardware. Software changes may be, for example, updates software components that are implemented by applying software patches, removing old versions, or installing new versions of the software. Further, changes may also include configuration changes to the underlying software components.

In one example, system administrator 504 may initiate hardware, software, and configuration changes. The other change management coordinators, such as change management coordinator 508 indicate that some service components need to be upgraded or are no longer needed in service. If a system administrator upgrades or removes a software component in an enterprise, change management coordinator 508 at the enterprise, communicates the changes to all other change management coordinators. As a result, the other change management coordinators initiate appropriate changes for appropriate service and software components from the affected resources. Examples of appropriate changes includes applying a patch to a software computer, changing the version of an installed application service, middleware components, or system basic input/output system (BIOS), and decommissioning a service.

Change management executor 510 processes the change request and identifies all high-level services that may be affected by the change. High-level services are one or more services, programs, applications, and functions that are executed by the enterprise to accomplish the business functions. The services are identified by scanning all the published high-level services and retrieving the object dependency graphs or dependency graphs, such as object dependency graph 400 of FIG. 4 corresponding to each high-level service from service and state repository 512.

The object dependency graph identifies the other services that the high-level service depends upon. For each node in the object dependency graph, change management executor 510 determines if the change would affect that node. If the change affects that node, then the information is recorded, and the object dependency graph corresponding to that node is retrieved. After all the affected nodes have been identified, change management executor 510 references policy database 514 to determine the action change management executor 510 needs to perform corresponding to the change request. For instance, if a new hardware element is to be inserted in the set of available resources, change management coordinator 508 creates and publishes the object representation for the new entity to service and state repository 512 where the new hardware element becomes available to use. An object representation is a data structure that represents the properties of a service and associated state in the repository. If a change request refers to removing a resource for service, change management coordinator 508 identifies all the high-level services that may be affected due to the removal.

Next, change management coordinator 508 refers to policy database 514 to determine if the removal is permitted given current service level agreements for the high-level service becoming unavailable in the future. Policy database contains rules and data to determine how and when a change may be implemented based on depending high-level services. Each high-level service that is hosted by an organization has associated service level agreements that need to be honored. The service level agreements have associated availability and quality of service requirements that a service provider must maintain at all times. When a change is requested for a particular service, change management coordinator 508 refers to the policy database to determine the policies associated with the service level agreements for a service.

One policy may permit the removal with the high-level service becoming unavailable in the future. Another potential policy in policy database 514 may deny removal unless a replacement resource is found to take up the role of the "marked to remove" node or hardware.

Change management coordinator 508 coordinates with deployment engine 516 to make or implement the needed changes. Deployment engine 516 manages resources 518A-518C and software components for services 520A-520C. Next, deployment engine 516 configures and deploys the needed changes using resources 518A, 518B, and 518C. For each resource, deployment engine 516 initiates the installation and configuration of services 520A, 520B, and 520C on the designated resources. Installation and configuration is completed by executing workflows specific to the affected service. Services 520A, 520B, and 520C running on resources 518A, 518B, and 518C may constitute a Web service implementation. An example of a deployment engine is the software product Tivoli Provisioning Manager offered by International Business Machines. Deployment engine 516 contains workflows that implement algorithms to install, uninstall, upgrade, and change a service and the service's dependent components. When change management coordinator 508 needs to make a change to a service, it invokes the appropriate workflow to effect the change.

FIG. 6 is a flowchart illustrating the steps performed by a change management system in accordance with an illustrative embodiment. The process of FIG. 6 may be implemented in a change management system by a change management coordinator, such as change management system 500 and change management coordinator 508 of FIG. 5, respectively. The process begins when the change management coordinator receives a change request (step 602).

Next, the change management coordinator identifies all of the dependency graphs that are affected by the change (step 604). The change management coordinator identifies all the dependency graphs by scanning the service and state repository, such as service and state repository 512 of FIG. 5.

Next, the process determines whether all the affected dependency graphs have been processed (step 606). The dependency graph may be an object dependency graph, such as object dependency graph 400 of FIG. 4. The dependency graphs have been processed when the change has been scheduled with the deployment engine. If all the affected dependency graphs have been processed, the process terminates. If all the affected dependency graphs have not been processed in step 606, the process determines the high-level services that are affected (step 608). In step 608, the change management coordinator determines the high-level services that are affected by identifying the service represented by the root of the affected dependency graph. For example, a service may be uniquely identified via the service's uniform resource identifier which is used to access the service by consumers. An example of a service is service 402 of FIG. 4 identified by uniform resource identifier foobar.redbank.com:80/AccountService, which may identify the StockService service that is accessible from system foobar.redbank.com. The uniform resource identifier is used as a key to retrieve the dependency graph associated with that service.

Next, the change management coordinator retrieves any policies from the policy database that are related to the affected high-level services (step 610). The policy database may be a policy database, such as policy database 514 of FIG. 5. Next, the change management coordinator heuristically determines the time duration needed to affect the requested change (step 612). The determination of step 612 is made based on policy.

A heuristic determination in step 612 is made by approximating how long is needed to implement the change and uses feedback from other similar changes to better determine how time is required to make the change. Next, the change management coordinator determines the best time to apply the requested change based on the policy for the high-level service (step 614). The policy of 614 preferably allows the change management coordinator to choose a time that minimizes the impact on the high-level service. Next, the change management coordinator schedules and coordinates the change with the deployment engine (step 616) with the process returning to the determination of step 606 thereafter.

FIG. 7 is a flowchart illustrating a change management coordinator scheduling and coordinating changes in accordance with an illustrative embodiment. The process of FIG. 7 is a more detailed description of step 616 of FIG. 6.

First, the change management coordinator determines the optimal time to perform the change (step 702). Next, the change management coordinator identifies the deployment engine workflow that will implement the change (step 704). The deployment engine is identified and selected to implement the change during step 704.

The deployment engine schedules and performs the execution of the workflow based on the optimal time once identified by the change management coordinator in step 704. Next, the change management coordinator waits for asynchronous notification of workflow completion (step 706) with the process terminating thereafter.

Based on the process of FIG. 7, the deployment engine implements the requested change when and how requested by the change management coordinator. Preferably, the change management coordinator schedules the change for the optimal time. The optimal time is based on policy and is used to least-detrimentally affect high-level services affected by the change. For example, if policies of different high-level services specify that changes be made between 1:00 a.m. and 4:00 a.m., and 2:00 a.m. is a time when the least users access the enterprise, the change is scheduled for 2:00 a.m.

Thus, the illustrative embodiments provide a computer implemented method, apparatus, and computer usable program code for making policy based changes in a network environment. The network environment may be a grid infrastructure or other federated network. The change management coordinator in a change management system identifies services and resources dependent on the change. The change management coordinator determines an optimal time for the change based on a policy associated with the service and schedules and coordinates the change with a deployment engine. As a result, the change is performed according to a user policy which ensures that high-level services affected by the change are implemented only as allowed by the policy.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for maintaining a computer network, the computer implemented method comprising:

responsive to receiving a request for a change to a resource, identifying resources and services affected by the change, wherein the services are a set of high-level services, wherein the identifying step further comprises:
  retrieving an object dependency graph for the at least one high-level service;
  identifying the at least one high-level services represented by a root of the object dependency graph;
  scanning a service and state repository to identify the object dependency graph; and
  determining whether the change is permitted to be implemented according to policies, wherein the policies are retrieved from a policy database;
  determining, by a processor, an optimal time for the change based on the policies associated with the services; and
  deploying the change with a deployment engine.

2. The computer implemented method of claim 1, wherein the computer network is a grid-based infrastructure of computing devices.

3. The computer implemented method of claim 1, wherein the change is requested in a federated system.

4. The computer implemented method of claim 1, wherein the services are a set of high-level services, wherein the set of high-level services is executed by an enterprise.

5. The computer implemented method of claim 4, wherein the identifying step further comprises:
  retrieving an object dependency graph for the at least one high-level service.

6. The computer implemented method of claim 5, wherein the retrieving step further comprises:
  determining if the change affects a node of the object dependency graph; and
  responsive to a determination that the change will affect the node, retrieving the object dependency graph associated with the node.

7. The computer implemented method of claim 4, wherein the determining step further comprises:
  retrieving policies associated with each of the at least one high-level service.

8. The computer implemented method of claim 6, wherein the policies are retrieved from a policy database.

9. A computer implemented method for maintaining a computer network, the computer implemented method comprising:
  responsive to receiving a request for a change to a resource, identifying resources and services affected by the change, wherein the services are a set of high-level services, wherein the set of high-level services is executed by an enterprise, wherein the identifying step further comprises:
    retrieving an object dependency graph for the at least one high-level service, wherein the retrieving step further comprises:
      determining, by a processor, if the change affects a node of the object dependency graph; and
      responsive to a determination that the change will affect the node, retrieving the object dependency graph associated with the node;
    identifying the at least one high-level services represented by a root of the object dependency graph;
    scanning a service and state repository to identify the object dependency graph; and
    determining whether the change is permitted to be implemented according to policies, wherein the policies are retrieved from a policy database;
  determining, by the processor, an optimal time for the change based on the policies associated with the services; and
  deploying the change with a deployment engine.

10. The computer implemented method of claim 1, further comprising:
  making the change consistent with policies, wherein the change is made by the deployment engine.

11. The computer implemented method of claim 10, wherein the making step further comprises:
  configuring and deploying the change to resources.

12. The computer implemented method of claim 1, further comprising:
  invoking a workflow to make the change, wherein the deployment engine executes the workflow to make the change.

13. The computer implemented method of claim 1, wherein the identifying step and determining step are performed by a change management coordinator; and
  wherein the change is received from a system administrator or another change management coordinator.

14. The computer implemented method of claim 1, wherein the change is any of a hardware change, a software change, and a configuration change.

15. A change management system comprising:
  a bus system;
  a storage device connected to the bus system; and
  a processor unit connected to the bus system configured to communicate with a change management coordinator interface for receiving a request from an administrator or other change management coordinators, and wherein the processor is further configured to communicate with a change management coordinator wherein the change management coordinator identifies resources and services affected by a change to a resource in response to receiving a request for the change, wherein the services are a set of high-level services, retrieves an object dependency graph for the at least one high-level service, identifies the at least one high-level services represented by a root of the object dependency graph, scans a service and state repository to identify the object dependency graph, determines whether the change is permitted to be implemented according to policies, wherein the policies are retrieved from a policy database determines an optimal time for the change based on a policy associated with a service and stored in a policy database within the change management coordinator, and schedules and coordinates the change with a deployment engine.

16. The change management system of claim 15, wherein the change management coordinator receives the change from another change management coordinator or a system administrator through a change management coordinator interface,
  wherein the change management coordinator identifies resources and services affected by retrieving an object dependency graph associated with the resources and services stored within a services and state repository operably connected to a processor,
  wherein the policy is retrieved from the policy database operably connected to the processor.

17. The change management system of claim 15, wherein the change management coordinator invokes a workflow to be implemented by the deployment engine for making the change.

18. A computer program product comprising a computer readable storage device including computer usable program code for maintaining a computer network, said computer program product comprising:
  responsive to receiving a request for a change to a resource for, computer usable program code for identifying resources and services affected by the change, wherein the services are a set of high-level services, wherein the identifying step further comprises:
- computer usable program code for retrieving an object dependency graph for the at least one high-level service;
- computer usable program code for identifying the at least one high-level services represented by a root of the object dependency graph;
- computer usable program code for scanning a service and state repository to identify the object dependency graph; and
- computer usable program code for determining whether the change is permitted to be implemented according to policies, wherein the policies are retrieved from a policy database;
- computer usable program code for determining an optimal time for the change based on a policy associated with the services; and
- computer usable program code for deploying the change with a deployment engine.

19. The computer program product of claim 18, further comprising:
- computer usable program code for invoking a workflow to make the change, wherein the deployment engine executes the workflow to make the change.

20. The computer program product of claim 18, wherein the computer usable program code for identifying the resources and services uses an object dependency graph and identifies the services using a uniform resource identifier.

* * * * *